Patented Apr. 8, 1924.

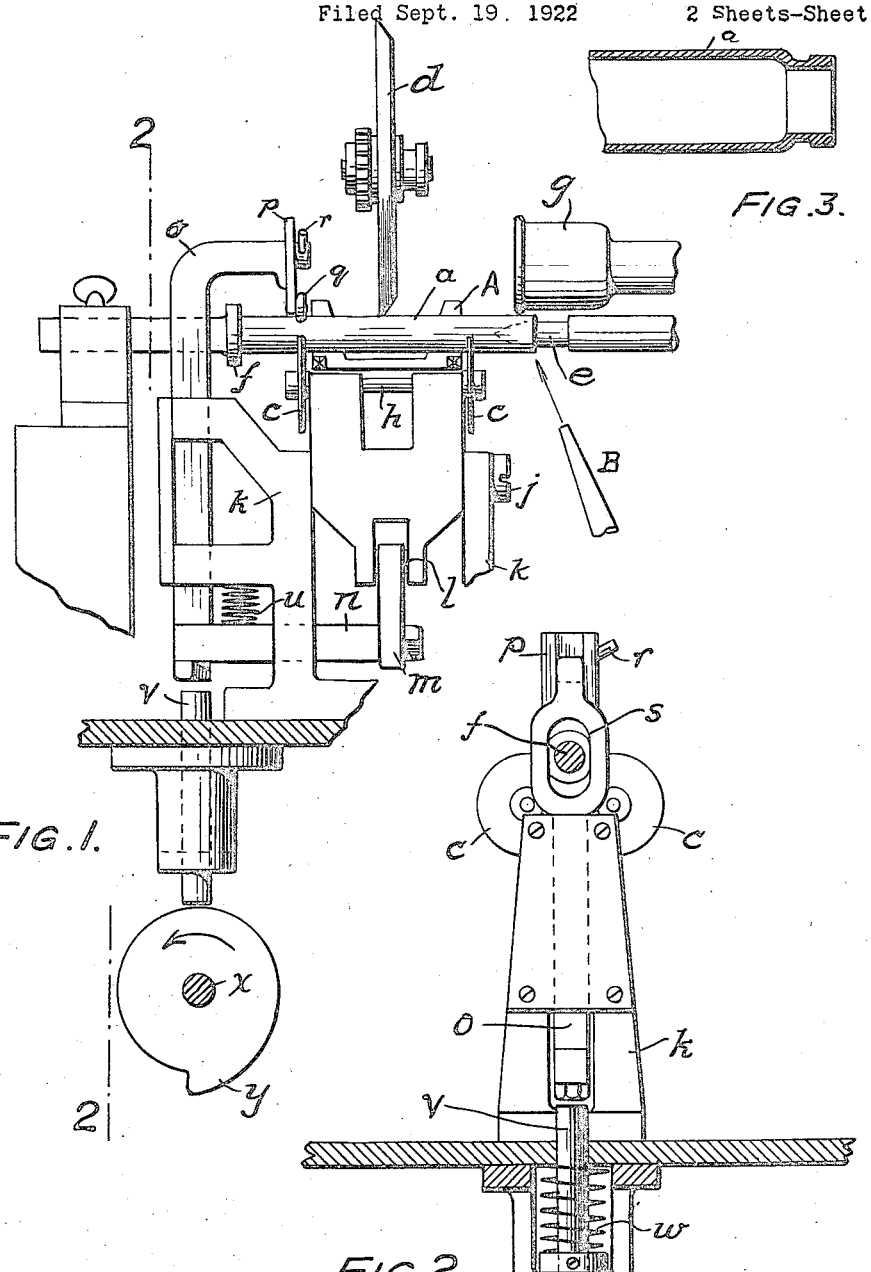

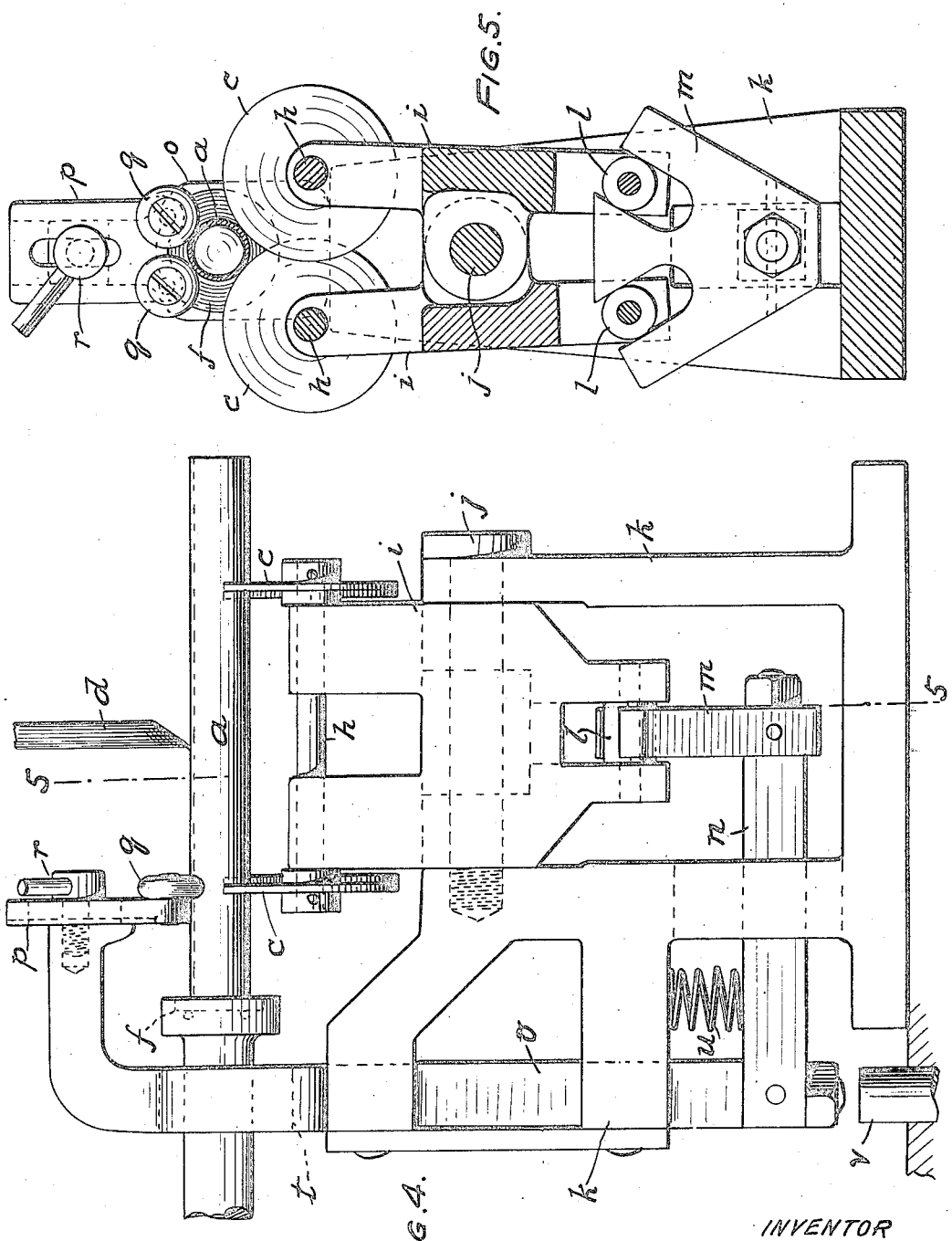

1,489,837

UNITED STATES PATENT OFFICE.

DAVID B. KING, OF MILLVILLE, NEW JERSEY, ASSIGNOR, BY MESNE ASSIGNMENTS, TO KIMBLE GLASS COMPANY, OF LANDIS TOWNSHIP, NEW JERSEY, A CORPORATION OF ILLINOIS.

MACHINE FOR NECKING VIALS OR BOTTLES.

Application filed September 19, 1922. Serial No. 589,092.

*To all whom it may concern:*

Be it known that I, DAVID B. KING, a citizen of the United States, residing at Millville, in the county of Cumberland and State of New Jersey, have invented a new and useful Improvement in Machines for Necking Vials or Bottles, of which the following is a specification.

Vials or bottles are made from pieces of glass tubing which is supposed to be of substantially the same diameter, but in fact glass tubing rated as of the same diameter varies in size. The mechanism which forms the necks of such vials or bottles operates upon the end of a tube whilst the same is in rotation so that it is important that the tube be properly centered in respect to that mechanism because otherwise the necks both inside and outside will not be uniform. But the variations in diameter of the tubing which is supposed to be of the same size are such that in many cases the mechanism for that reason forms corkage of different sizes, thus producing defective bottles or vials and causing waste.

The principal object of the present invention is to provide mechanism for automatically presenting the rotating tubes properly to or co-axially with the corkage forming mechanism, even though the tubes vary in diameter, whilst nominally of the same size.

To this and other desirable ends, the invention may be said generally to comprise the combination with the corkage or neck forming mechanism, of a scissor-like support for the rotating tube by which it is axially aligned with such forming mechanism, and means responsive to the diameter of and actuated by the rotating tube and adapted to position said scissor-like support.

The invention further comprises the improvements to be presently described and finally claimed.

In the following description, reference will be made to the accompanying drawings forming part hereof and in which—

Figure 1 is a view, partly in section, illustrating mechanism embodying features of the invention and showing the same in application to a machine for making the corkage or necks of vials or bottles.

Fig. 2 is a sectional view taken on the line 2—2 of Figure 1.

Fig. 3 is a view illustrating in section a finished vial or bottle.

Fig. 4 is a view drawn to an enlarged scale and illustrating features of the invention, and Fig. 5 is a sectional view on the line 5—5 of Fig. 4.

Referring to the drawings, $e$ is a plug adapted to enter the end of a tube and $g$ is a flanged roller, the plug and roller co-operating to form the neck on the end of the bottle or rotating tube $a$, the plug forming the corkage. $f$ is a rotatable abutment for the opposite end of the tube. $d$ is a resilient, beveled roller usually of rubber or the like, and it serves to rotate the tube $a$ and also to position the tube against the abutment. The described parts are usual provisions of a machine for making vials or bottles and in and of themselves they form no part of the present invention. The two arms $i$ both pivoted at $j$ and having at one of their ends rollers $c$ on shafts $h$, and at the other of their ends rollers $l$, constitute a scissor-like support for the rotating tube $a$, Fig. 5. If the upper ends of these arms $i$ are made to recede from each other it is evident that the axis of the tube $a$ is lowered and that if the upper ends of these arms $i$ are made to approach each other the axis of the tube $a$ is elevated to a higher level. By positioning the arms $i$ in the manner described it is possible to bring the axis of the tube $a$ into alignment with the axis of the plug $e$, and the fact that the roller $d$ is resilient permits of such adjustment, whilst the roller $d$ is rotating the tube $a$ upon the supporting rollers $c$, of which four are shown. The arms $i$ are positioned in response to the diameter of each tube $a$ that is being worked upon. For that purpose there is provided a frame $o$ slidably mounted in the fixed base $k$ and equipped with a grooved cam $m$, operating upon the rollers $l$, and with rollers $q$ that ride on the tube $a$. There is a spring $u$ interposed between the frame $o$ and the base $k$, and it tends to shift the frame downward, balancing the thrust of the roller $d$ and leaving the rollers $q$ free to ride in contact with the tube $a$. The positively driven cam $y$ mounted on the shaft $x$ operates a follower $v$, pressed by spring $w$, and the movement of the shaft $x$ is so timed that the follower $v$ lifts the frame o and rollers q at the time when the tube a is deposited between the rollers c and the roller d, for example, by means of a conveyor, a portion of which is indicated at A in Figure 1, and which is well understod. n is an arm which may be regarded as a part of the frame o and on which the cam m is mounted.

The rollers q are shown as mounted upon a plate p having sliding adjustment with a part of the frame o and held in place by a clamping screw r. The purpose of this adjustment is to accommodate the device to tubes rated as of different diameters and not to such variations in diameter as occur in tubes rated as of the same diameter. The frame o is slotted as indicated at s for the accommodation of the abutment f, so that the frame can rise and fall in respect to the abutment.

The lower portion t of the slotted part s may be arranged to serve as a limit stop in connection with the base k, Figures 2 and 4.

The mode of operation of the described mechanism may be explained as follows: The high part of the cam y operating upon the follower v lifts the frame o and in that way raises the rollers q and spreads the rollers c apart thus affording room between the rollers through which the tube a can be fed onto the rollers c and under the rollers q. Then the cam y causes the follower v to release the frame o which descends until its downward movement is limited by the riding of the rollers q on the top of the tube a. This positioning of the frame acting through the cam m determines the distance apart of the centers of the rollers c, and the combined operation brings the axis of the tube a into line with the axis of the plug e, in the case of tubes a, which differ in diameter, although supposed to be uniform in that regard. The operation of the neck forming mechanism e and g and of the burner or heater B is well understood and needs no particular description.

It will be obvious to those skilled in the art to which the invention relates that modifications may be made in details of construction and arrangement of parts without departing from the spirit of the invention, which is not limited as to those matters or otherwise than as the prior art and the appended claims may require.

I claim:

1. In an appliance of the character described, the combination of a glass-working tool, means to support a glass-body, and means coacting with said glass-body governing the position of said supporting means, whereby bodies of slightly varying sizes will be supported in correct register with said tool.

2. In an appliance of the character described, the combination of a glass-working tool, rollers adapted to support a glass-body, means to move said rollers toward and from one another thus varying the position of the glass-body supported thereon, and means coacting with the glass-body governing the position of said rollers relatively to one another; whereby bodies of slightly different sizes will be supported in correct register with said tool.

3. In an appliance of the character described, the combination of a glass-working tool, rollers adapted to support a glass-body, means to move said rollers toward and from one another thus varying the position of the glass-body supported thereon, and means adapted to bear on the top of the glass-body on said rollers governing the position of the latter, whereby bodies of slightly different sizes will be supported in correct register with said tool.

4. In an appliance of the character described, the combination of a glass-working tool, movably mounted rollers adapted to support a glass-body while acted upon by said tool, a movable frame, means to move said frame, means controlled by the movement of said frame to move said rollers to change the position of the glass-body thereon, and gauge means on said frame adapted to coact with said glass-body and govern the extent of movement of said frame, whereby bodies of slightly different sizes will be supported on said rollers in correct register with said tool.

5. In an appliance of the character described, the combination of a glass-working tool, a pair of rock-arms, rollers on said arms adapted to support a glass-body while acted upon by said tool, a movable frame, means to move said frame, a roller on said frame adapted to bear on the glass-body on said supporting rollers and thereby limit the movement of said frame, and cam means between said frame and rock-arms whereby movements of the former cause said supporting rollers to approach and recede from one another, thereby changing the position of the glass-body thereon, whereby bodies of slightly different sizes will be supported on said rollers in correct register with said tool.

DAVID B. KING.